United States Patent Office 3,312,584
Patented Apr. 4, 1967

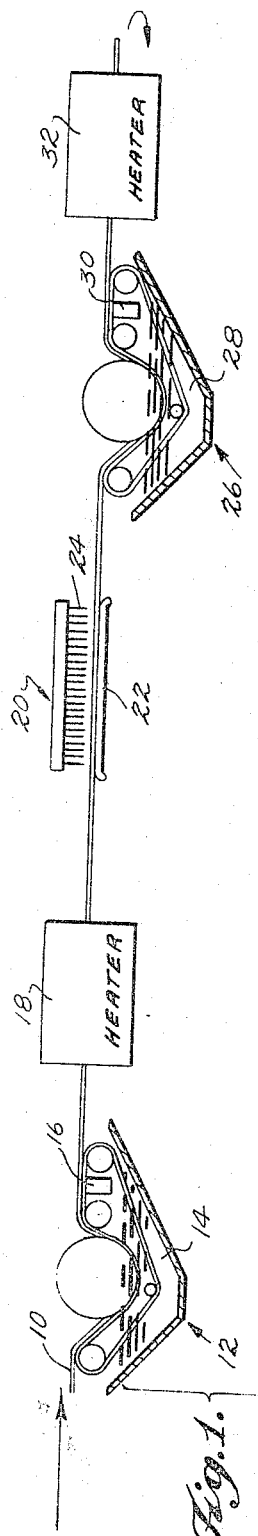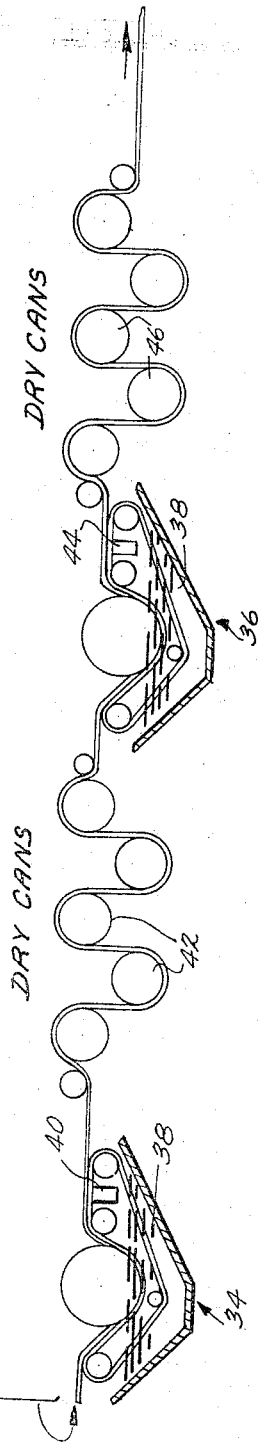

3,312,584
NONWOVEN FABRIC AND METHOD OF
MANUFACTURING THE SAME
Richard E. Charlton, Jr., and Paul Anthony Homier, Fairfax, Ala., and Richard E. Hudson, Jr., West Point, Ga., assignors to West Point-Pepperell, Inc., a corporation of Georgia
Filed Nov. 9, 1962, Ser. No. 237,448
9 Claims. (Cl. 161—81)

This invention relates to nonwoven fabric, and in particular to porous, tacky and extensible nonwoven fabrics suitable for use as tire chafer. The invention relates also to the process of manufacturing the fabric. This application is a continuation-in-part of our copending application Serial No. 170,355, filed February 1, 1962, now abandoned.

Tire chafers are commonly constructed of woven fabric of appropriate construction and weight. The woven fabric is customarily pre-dipped in dilute synthetic resin latex dispersion to add a minor quantity of the dispersion to the fabric, for example 12% solids based on the weight of the fabric. The dipped fabric is then dried and the resin latex cured, whereupon the fabric is formed into rolls and shipped to the tire factory. At the tire factory, the pre-dipped fabric is frictioned and coated with rubber or other elastomeric composition, usually in a plurality of steps, to give the fabric the required physical structure and tire building tack. Because the woven chafer fabric has substantially no stretch, it is usually then cut into strips on the bias, and the bias-cut strips assembled end to end with overlapping joints to form a continuous strip suitable for tire building in the customary manner. Reassembly of the bias-cut strips and joining them end to end are essentially manual operations, and the overlapping joints in the resultant continuous strip represent undesirable deviations from uniformity.

A principal object of the present invention is the provision of a non-air wicking tire chafer characterized by tire building tack, internal bond strength, extensibility and porosity, eminently suitable for use as tire chafer. A related object is the provision of a simple, inexpensive, readily controllable process for manufacturing the fabric.

Another object is the provision of an improved nonwoven tire chafer fabric which may be completely manufactured at the nonwoven fabric mill, having requisite tack and other properties for use in tire building without further processing. The fabric is readily slit into continuous strips which may be supplied in large rolls ready for use. Thus frictioning, skim coating, bias cutting and manual reassembly of the chafer strips at the tire factory are obviated.

Still another object is the provision of tire chafer fabric made from multidirectional nonwoven fiber webs bonded by elastomeric material, whereby the fabric has adequate strength and extensibility in all directions, and is readily formed and shaped as necessary in tire building, without puckering or creasing. The weight, porosity, tack and other properties of the fabric may be readily controlled and maintained uniform by the process of the invention, and the fabric, moreover, is non-wicking to gas. Further objects will be in part evident and in part pointed out hereinafter.

The invention and the novel features thereof will be made clear and readily understood from the following description and the accompanying drawings, in which:

FIGURE 1 is a diagrammatic sketch illustrating an exemplary embodiment of the process of the invention;

FIGURE 2 is a sectional view, on enlarged scale, of a fabric made by the process of FIGURE 1, and FIGURE 3 is a sectional view of a similar fabric in accordance with the invention, illustrating omission of an optional needle punching step in the manufacturing process.

EXAMPLE I

In accordance with FIGURE 1, an airlaid web 10 of viscose rayon fibers, 5.5 denier and 1 9/16 inches fiber length, weighing two ounces per square yard, is conducted through a dip tank 12 containing a prebonding bath 14 of elastomeric material. The web 10 may be formed in accordance with Phillips et al. U.S. Patent 2,648,876, and the dip tank may be constructed as shown in that patent. The prebonding bath 14 is a dilute aqueous dispersion, 3% solids, of the following composition (dry solids basis):

| | Parts |
|---|---|
| Butadiene-styrene latex (70/30), Naugatex 2105 | 68.0 |
| Vinyl pyridine-butadiene-styrene terpolymer latex, Gentac | 17.0 |
| Formaldehyde | 4.8 |
| Resorcinol | 9.0 |
| Caustic soda | 1.2 |
| | 100.0 |

Naugatex is a trademark of the Naugatuck Chemical Division of United States Rubber Co. Gentac, a trademark of the General Tire & Rubber Co., is a rubbery latex exhibiting a high degree of adhesion, and believed to contain a high proportion of butadiene.

In passage through bath 14, the web is thoroughly impregnated with the prebonding dispersion, and excess liquid is removed therefrom by the suction box 16. The wet web is then conducted through an oven or heater 18, wherein it is dried at 335° F. At this temperature, the prebonding material is substantially completely cured in from 30 to 60 seconds. As is well known, as the web is dried, the prebond material tends to migrate to the fiber intersections, where it dries to lightly bond and stabilize the web. The binder pickup in the prebonding step is about 3%, whereby the prebonded web leaving heater 18 weighs approximately 2.06 ounces per square yard.

The lightly bonded web is then conducted through a conventional needle loom 20, wherein it is supported by the underlying support 22 while punched by conventional barb needles 24. About 140 punches per square inch are applied, the needle penetration through the fabric being 5/8-inch. The needles are effective in the usual manner to reorient fiber bundles in direction normal to the fabric surfaces, and these fiber bundles provide high internal bond strength and resistance to delamination, and serve as passages or pores facilitating entry of additional material into the interior of the web.

After needle punching, the fabric is conducted through a dip tank 26 containing a rebonding bath 28 of elastomeric composition. The rebonding bath 28 is a 25% solids dispersion of the following composition (dry solids basis):

| | Parts |
|---|---|
| Natural rubber latex | 63.1 |
| Butadiene-styrene latex (70/30), Naugatex 2105 | 34.5 |
| Styrenated phenol type antioxidant, (Wingstay S) | 2.0 |
| Potassium rosin soap stabilizer—Dresinate 515 | 0.4 |
| | 100.0 |

Wingstay is a trademark of the Goodyear Tire & Rubber Co., and Dresinate is a trademark of the Hercules Powder Co.

The web in passage through the rebonding bath 28 is thoroughly impregnated, and excess impregnant is removed therefrom by the suction box 30. The rebonded web then passes through the oven or heater 32, wherein it is completely dried at a temperature of 330° F. The binder pickup in this rebonding step is about 50%, the web leaving heater 32 weighing about 3.2 ounces per square yard. The temperature in heater 32 insures complete cure of the prebonding material applied in dip tank 12, but the lastomeric rebond material applied in bath 28 is non-curable, and contains no vulcanizing agent, accelerator or catalyst, whereby it dries without curing or vulcanization.

The fabric leaving heater 32 is conducted successively through dip tanks 34 and 36, each of which contains a rebonding bath 38 identical in composition with the rebonding bath 28, but more concentrated, being dispersions of about 65% solids. The fabric leaving dip tank 34 passes over suction box 40 whereat excess impregnant is removed, and is then dried on dry cans 42 at a temperature of 250° F. Similarly, the fabric on leaving the dip tank 36 passes over suction box 44, and is then dried on dry cans 46 at 250° F. The dry weight of the fabric is increased to 6 ounces per square yard by passage through dip tank 34, and to 8.5 ounces per square yard on passage through the dip tank 36. Alternatively, additional binder may be applied by other convenient means, such as dip and squeeze padders.

The dried product leaving the dry cans 46 may be slit into strips and rolled, and is ready for use in tire building as tire chafer strips. The rebond composition applied in dip tanks 26, 34 and 36 being uncured and unvulcanized, the fabric is tacky to itself and to uncured gum rubber stock, natural, butyl and GR–S. The tack of the product, while ideal for tire building, does not prevent unrolling as the product has adequate strength and cohesion to permit easy separation of layers pressed together. The dried product retains some porosity, which facilitates incorporation in tire bodies, is readily extensible to facilitate forming and shaping, and is otherwise ideally suited for use as tire chafer. The finished fabric 48 is illustrated in FIGURE 2, wherein 50 represents the reoriented fiber bundles resulting from the needle punching.

As will be evident, the process above described may be continuous, but if preferred the process may be interrupted after any of the drying steps, and after the needle punching step. The fabric partly or completely impregnated with the rebonding composition may be stored for reasonable lengths of time before further processing and/or use, as the rebond material exhibits little tendency to cure, oxidize or otherwise deteriorate.

EXAMPLE II

A web was made, prebonded, initially rebonded and dried as in Example I, the procedure of Example I being followed through the initial rebonding bath 28 and oven 32, to produce a web weighing about 3.2 ounces per square yard, in which the prebonding material applied in dip tank 12 is completely cured, and the rebond material applied in bath 28 is uncured.

The fabric leaving heater 32 is then conducted successively through dip tanks 34 and 36, each of which contains the following rebond composition (dry solids basis):

| | Parts |
|---|---|
| Natural rubber latex | 66.4 |
| Butadiene-styrene latex (70/30) Naugatex 2105 | 22.1 |
| Styrenated phenol type antioxidant, Wingstay S | 1.8 |
| Potassium rosin soap stabilizer, Dresinate 515 | 0.4 |
| Glyceryl ester of rosin, Nopco 2271 | 7.1 |
| Carbon black pigment, Aquablack K | 1.0 |
| Zinc oxide | 0.444 |
| Sulfur | 0.444 |
| Zinc mercaptobenzothiazole, Zelax | 0.222 |
| Diphenyl guanidine (DPG) | 0.090 |
| | 100.000 |

Nopco is a trademark of the Nopco Chemical Company, Newark, N.J.; Aquablack K is a trademark of the Columbian Carbon Company; Zetax is a trademark of the R. T. Vanderbilt Company, and DPG is a trademark of the American Cyanamid Company. In accordance with this example, the rebonding baths 38 are concentrated dispersions, of about 60% solids, and maintained at a pH of about 10 by the addition of caustic soda.

The fabric leaving dip tank 34 passes over suction box 40 whereat excess impregnant is removed, and is then dried on dry cans 42 at a temperature of about 220° F. Similarly, the fabric on leaving the dip tank 36 passes over suction box 44, and is then dried on dry cans 46 at about 220° F. The dry weight of the fabric is increased to about 5.5 ounces per square yard by passage through dip tank 34, and to about 8 ounces per square yard on passage through the dip tank 36. The dried product leaving the dry cans 46, as in Example I, may be slit into strips and rolled, and is ready for use in tire building as tire chafer strips.

In Example II, minor amounts of rubber curatives have been incorporated in the rebonding baths 38, and this has been found in some circumstances to facilitate ultimate curing of the tire chafer in the tire molding machines. The addition of carbon black pigment in the rebonding baths facilitates tire making but tends to reduce tack, and in this example the glyceryl ester of rosin functions as an additional tackifier, to compensate for the addition of the pigment and bring the tack of the final product to the desired level. The minor amount of rubber curatives incorporated in the rebonding baths 38 of Example II is sufficient only to partly cure the rebond material, and the rebond material is not cured thereby at all, or at any rate to a significant degree, in drying at 220° F. The rebond material in the product, accordingly, is substantially uncured, or cured only to a minor degree.

While the foregoing represent specific examples illustrating the process and product of the invention, the invention encompasses numerous variations and alternatives. For example, the fibers forming the base web may be any fibers, natural or synthetic, not detrimentally affected by drying at the cure temperature of the prebond material. Among suitable fibers are cotton, viscose, polyamide (e.g. nylon), polyester (e.g. Dacron), polyacrylic (e.g. Orlon) and mixtures thereof. The fiber web should be multi-directional, but need not be airlaid in random arrangement, but may be composed of crosslaid card or similar webs as well. The length of fiber used to make the web is subject to considerable variation, and may extend from ¼ inch or less to 5 inches or more. Similarly, the fiber deniers may range from 1 to 60 or more. When low denier fiber is employed, ranging from 1 to about 10, it has been found that needle punching after prebonding improves the cohesive strength of the product, as tested when molded in rubber. This apparently results from the circumstance that reorientation of some of the fibers facilitates flow of elastomeric material into the interior of the web, and the reoriented fibers provide added resistance to delamination. At higher fiber deniers, the web structure appears to be sufficiently coarse that elastomeric material flows therethrough quite readily, whereby adequate porosity and cohesive strength is attained without needle punching.

The prebonding composition may be varied in many respects, in accordance with the desired properties of the finished product. Desirably, the prebonding composition includes resin and elastomer, adapted to stabilize the web and facilitate the adhesion of other elastomeric material. The butadiene-styrene latex, if employed, may be any rubbery butadiene-styrene, containing a predominance of butadiene. Vinyl pyridine-butadiene-styrene latices suitable in the invention are also available from the Goodyear Tire & Rubber Co., under the trademark Pliolite VP100, and from the B. F. Goodrich Chemical Co., a division of the B. F. Goodrich Co., under the trademark Hycar 2508. Resin-forming ingredients other than resorcinol and formaldehyde may be utilized.

Other elastomers, including natural, CR-S and nitrile rubber, may be used in the prebonding composition, either alone or with other elastomer and/or resin. An excellent composition for the purpose may include nitrile rubber latex, such as Chemigum 245CHS, medium nitrile butadiene-acrylonitrile rubber latex (Goodyear Tire & Rubber Co.) or Hycar 1572, medium nitrile, carboxylated butadiene acrylonitrile rubber latex (B. F. Goodrich Chemical Co., a division of the B. F. Goodrich Co.), aldehyde resins such as Aerotex Resin 23, a thermosetting aldehyde resin precondensate, triazine type (American Cyanamid Co.) or Aerotex Resin M-3, a thermosetting aldehyde resin precondensate, a methylated methylol melamine resin (American Cyanamid Co.), and diammonium phosphate, a catalyst for resin cure.

If needle punching is to be utilized, the binder pickup in the prebonding step may be between 0.5 and 5% since more binder might interfere with the needling operation; if needle punching is omitted, the binder pickup in the prebonding step may be as much as 10% or more. The extent of needling is subject to wide variation, from zero up to about 2,000 punches per square inch, although relatively light needling, between about 100 and about 200 punches per square inch, is normally preferred.

The drying temperature in the heater 18 is desirably such as to completely cure the prebonding material, and if this temperature is above ordinary drying temperatures, the temperature in the heater 32 may be the same, to insure complete curing of the prebonding material.

The composition of the rebonding baths 28 and 38 may be varied, the primary consideration being to produce an elastomeric impregnant having requisite tack. Common antioxidants and stabilizers, for example, may be utilized, or omitted in special circumstances. The degree of tack of the rebond material may be controllably varied by incorporation of fillers, such as carbon black or clay, in the rebond composition.

The final product may range in weight from about 2 to about 20 ounces per square yard, and the weight of fiber therein may range from about 15% or less up to about 50%. A binder/fiber ratio of 3:1 appears to represent an optimum ratio for most purposes. As will be evident, the product is useful not only as tire chafer fabric, but in the construction of belts, fuel cells and the like as well. Depending on the final fiber-binder ratio desired, the number of passes or padding steps utilized to apply the rebond material is subject to considerable variation. If the binder-fiber ratio of the product is to be, for example, 1:1, a single pass through a dip tank may suffice for application of the rebond material. If the binder/fiber ratio is to be 6:1, 4 or more passes may be desirable to apply the rebond material in uniform manner, while maintaining the desired fabric properties.

FIGURE 3 represents a product 52 manufactured in accordance with the abovedescribed procedure, wherein the fiber web is composed of 15 denier viscose rayon fibers, and the needle punching operation is omitted.

It will thus be seen that there has been provided by this invention a process and product in which the various objects hereinbefore set forth, together with many practical advantages, are successfully achieved. As various possible embodiments may be made of the novel features of the above invention, all without departing from the scope thereof, it is to be understood that all matter hereinbefore set forth is to be interpreted as illustrative, and not in a limiting sense.

We claim:

1. Process of manufacturing nonwoven fabric comprising the steps of prebonding a multidirectional fiber web with a minor quantity of elastomeric material based on the total weight of elastomeric material, subjecting the treated web to a temperature sufficient to dry the web and cure the prebond elastomeric material, rebonding the web with a major quantity of elastomeric material based on the total weight of elastomeric material and subjecting the treated web to a temperature sufficient to dry the web without substantially curing the rebond elastomeric material.

2. Process as defined in claim 1 wherein said web is composed of synthetic organic plastic fibers not exceeding about 15 deniers and representing not over 50% by weight of the final product.

3. Process as defined in claim 1 wherein said prebond elastomeric material includes vinyl pyridinebutadiene-styrene terpolymer latex and butadiene-styrene latex and said rebond material includes natural rubber latex and butadiene-styrene latex.

4. Process of manufacturing nonwoven fabric comprising the steps of prebonding a multidirectional fiber web with 0.5 to 5% based on the weight of fiber web of an elastomeric material, subjecting the treated web to a temperature sufficient to dry the web and cure the prebond elastomeric material, need punching the prebonded web, rebonding the needle punched web with at least 100% based on the weight of the fiber web of an elastomeric material and subjecting the treated web to a temperature sufficient to dry the web without substantially curing the rebond elastomeric material.

5. A nonwoven fabric characterized by tire building tack, internal bond strength, extensibility and porosity, comprising a multidirectional fiber web bonded with a minor amount of a cured elastomeric material based on the total weight of elastomeric material and impregnated with a major amount of a substantially uncured elastomeric material.

6. A nonwoven fabric in accordance with claim 5 wherein said uncured elastomeric material is present in amounts at least about 100% based on the fiber weight and wherein said uncured elastomeric material includes natural rubber latex and butadiene-styrene latex.

7. A nonwoven fabric characterized by tire building tack, internal bond strength, extensibility and porosity, comprising a needle punched, multidirectional fiber web bonded with a minor amount of a cured elastomeric material based on the total weight of elastomeric material and impregnated with a major amount of a substantially uncured elastomeric material.

8. A nonwoven fabric characterized by tire building tack, internal bond strength, extensibility and porosity, comprising a needle punched, multidirectional fiber web bonded with about 0.5 to 5% based on the weight of the fiber web of cured elastomeric material and impregnated with at least about 100% based on the weight of the fiber web of a substantially uncured elastomeric material.

9. The nonwoven web of claim 8 wherein the fiber web is impregnated with about 300% based on the fiber web of a substantially uncured elastomeric material.

References Cited by the Examiner

UNITED STATES PATENTS

| | | | |
|---|---|---|---|
| Re. 23,451 | 1/1952 | Mighton | 156—110 |
| 1,211,351 | 1/1917 | Price | 156—110 |
| 1,519,545 | 12/1924 | Marquette | 156—128 |
| 2,098,038 | 11/1937 | Hazell | 156—110 |
| 2,822,026 | 2/1958 | Willis | 156—334 X |
| 3,022,813 | 2/1962 | Glover | 161—154 X |
| 2,970,365 | 2/1961 | Morgenstern | 161—81 |
| 2,978,784 | 4/1961 | Koch | 28—72 |
| 2,985,217 | 5/1961 | Kuhlman | 152—362 |
| 3,013,599 | 12/1961 | Riggs | 152—362 |
| 3,038,518 | 6/1962 | Hershey | 152—362 |
| 3,116,164 | 12/1963 | Miller et al. | 156—334 |

EARL M. BERGERT, Primary Examiner.

C. B. COSBY, Assistant Examiner.